S. J. Sherman.
Corset.

No. 2208. Reissued Mar. 20. 1866.

Witnesses.

John Noble

Marbyline Akers

Signature.

S. J. Sherman

UNITED STATES PATENT OFFICE.

SYLVESTER J. SHERMAN, OF BROOKLYN, NEW YORK.

IMPROVEMENT IN SPRINGS FOR LADIES' DRESSES.

Specification forming part of Letters Patent No. 34,531, dated February 25, 1862; Reissue No. 2,208, dated March 20, 1866.

*To all whom it may concern:*

Be it known that I, SYLVESTER J. SHERMAN, of Brooklyn, in the county of Kings and State of New York, have invented a new and useful improvement in the ends of steel stiffening-pieces in dresses, corsets, and other articles of clothing; and I do hereby declare that the following is a full and exact description thereof.

My invention consists in providing the ends of the steel with a covering permanently attached, and which serves to prevent it from inflicting injury on the clothing or person of the wearer. The spring thus provided may be inserted more easily than if left with its end bare, as usual, and it may be more safely and securely held by ordinary means. The importance of these results will be readily appreciated both by those who manufacture and by those who use these adjuncts of dress. As heretofore manufactured the steel has been very liable by its thinness and sharpness to cut the fibrous material by which it is confined, and to protrude through the cloth in a very annoying, if not dangerous, manner after a little wear.

I will proceed to describe what I consider the best mode of carrying out my invention, reference being had to the accompanying drawings, forming a part of this specification, in which similar letters of reference denote like parts in all the figures.

Figure 1:
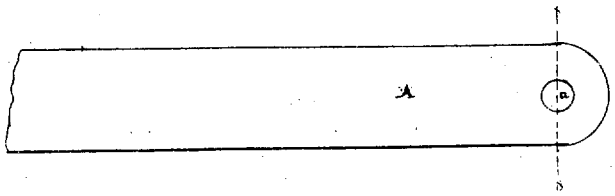

Figure 1 is a side view of the end of the steel A.

Figure 2:
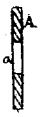

Fig. 2 is a cross-section thereof on line S S. The end of the steel is rounded and punched with a hole, *a*, as represented. This may be done without requiring the temper of the steel to be removed.

Figure 3:
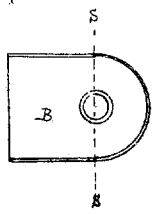

Fig. 3 is a side view of a piece, B *b*, of softer metal, as prepared for covering the steel A, at and near the end, and lining the interior of the hole *a*.

Figure 4:
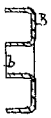

Fig. 4 is a cross-section on the line S S. The part *b* is tubular, as represented, and the edges of B on three sides are bent up or turned partly over, as represented. B and *b* are made in one piece, and may be produced by striking up in dies from suitable pieces of sheet metal. The best material is brass, bronze, white metal, or any metal sufficiently soft to produce the proper effect. The parts A *a* and B *b* are to be applied together in the manner which is obvious, so that the edges of B shall project beyond or partially embrace A on three sides, and the tubular part *b* shall enter the hole *a*. The whole is then to be compressed between dies adapted to spread the end of *b* and to fold over and flatten down and smoothly finish the edge of B.

Figure 5:
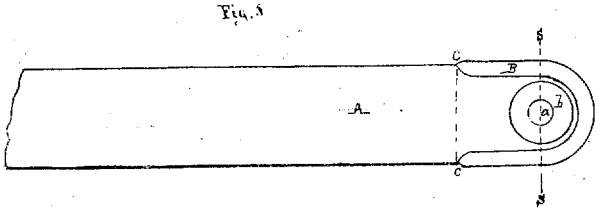

Fig. 5 is a side view of the job when finished, the corners of B, at *c c*, having by the form and operation of the compressing-dies been thinned and rounded, as represented, so as to present little or no sharp salient angle at the junction of B with A. The construction of the dies to effect this will be obvious to every mechanic skilled in the striking up of metals, and need not be specially delineated.

Figure 6:
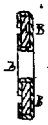

Fig. 6 is a cross-section of the finished end on the line S S in Fig. 5. The hole *a* in the steel and the corresponding part, *b*, of the soft-metal covering may be omitted; but I prefer to produce the hole and insert and spread or expand the soft covering through such hole, because it increases the security with which the covering is retained.

By my invention, as above applied, the spring may be of thin tempered steel, as usual, with the end thickened, smoothed, and rounded, and the character of the surface presented is adapted to allow its ready confinement by thread or other fastening inserted in the hole, or even by any suitable means tightly embracing the exterior alone of the ends.

Having now fully described my invention, what I claim as new, and desire to secure by Letters Patent, is—

A spring or busk for clothing, having the ends permanently covered and rounded, substantially as and for the purpose herein set forth.

S. J. SHERMAN.

Witnesses:

JOHN NOBLE,

MASKEYLINE ALCOCK.